US010674873B2

(12) United States Patent
Gogorza Segurola et al.

(10) Patent No.: US 10,674,873 B2
(45) Date of Patent: Jun. 9, 2020

(54) COOKING APPLIANCE FOR PROCESSING FOOD

(71) Applicant: SAMMIC, S.L., Azkoitia, Guipúzcoa (ES)

(72) Inventors: Aitor Gogorza Segurola, Guipúzcoa (ES); Chao Chen, Guipúzcoa (ES)

(73) Assignee: SAMMIC, S.L., Azkoitia, Guipúzcoa (ES)

( * ) Notice: Subject to any disclaimer, the term of this patent is extended or adjusted under 35 U.S.C. 154(b) by 119 days.

(21) Appl. No.: 15/744,167

(22) PCT Filed: Jul. 22, 2016

(86) PCT No.: PCT/ES2016/000083
§ 371 (c)(1),
(2) Date: Jan. 12, 2018

(87) PCT Pub. No.: WO2017/021569
PCT Pub. Date: Feb. 9, 2017

(65) Prior Publication Data
US 2018/0199761 A1    Jul. 19, 2018

(30) Foreign Application Priority Data
Jul. 31, 2015  (ES) .................................. 201500579

(51) Int. Cl.
*A47J 43/07*       (2006.01)
*A47J 43/044*      (2006.01)
*A47J 43/08*       (2006.01)

(52) U.S. Cl.
CPC ....... *A47J 43/0711* (2013.01); *A47J 43/0705* (2013.01); *A47J 43/0755* (2013.01);
(Continued)

(58) Field of Classification Search
CPC ................ A47J 43/0711; A47J 43/0705; A47J 43/0755; A47J 43/082; A47J 2043/04409;
(Continued)

(56) References Cited

U.S. PATENT DOCUMENTS 5,352,866 A    10/1994  Cartwright et al.
5,610,585 A    3/1997   Jobe
(Continued)

FOREIGN PATENT DOCUMENTS

CN    103230230 A    8/2013
EP    2 334 219 B1   9/2012
(Continued)

OTHER PUBLICATIONS

International Search Report of PCT/ES2016/000083, dated Sep. 16, 2016.

*Primary Examiner* — Marc C Howell
(74) *Attorney, Agent, or Firm* — Collard & Roe, P.C.

(57) ABSTRACT

A cooking appliance for processing food, more specifically a cooking appliance of the type that include a body housing an electric motor, a shaft for actuating a processing tool, and an integral handle, the various processing tools being coupled to the body by means of an arm that comprises an implement, such as a grinding, whisking or mixing implement, where the operating control of the appliance (on, off, rotating speed of the implement, etc.) is carried out by means of a sensor system that can detect a characteristic or predetermined movement performed on the appliance and can interpret said movement as an operating instruction, for example, turning the implement on, turning it off, and establishing and controlling the rotating speed thereof, etc.

6 Claims, 7 Drawing Sheets

(52) U.S. Cl.
CPC .... *A47J 43/082* (2013.01); *A47J 2043/04409* (2013.01); *A47J 2043/04427* (2013.01); *B01F 2215/0026* (2013.01)

(58) Field of Classification Search
CPC .... A47J 2043/04427; B01F 2215/0026; B01F 13/002
USPC .......................................................... 366/129
See application file for complete search history.

(56) References Cited

U.S. PATENT DOCUMENTS

| | | | |
|---|---|---|---|
| 7,461,967 B2 | 12/2008 | Garcia et al. | |
| 2007/0159917 A1* | 7/2007 | Beesley | A47J 43/044 366/129 |

FOREIGN PATENT DOCUMENTS

| | | |
|---|---|---|
| ES | 1 060 846 U | 11/2005 |
| GB | 2518422 A | 3/2015 |
| WO | 2005/008511 A1 | 1/2005 |
| WO | 2014/022876 A1 | 2/2014 |
| WO | WO-2014022876 A1 * | 2/2014 .......... A47J 43/1068 |

* cited by examiner

COOKING APPLIANCE FOR PROCESSING FOOD

CROSS REFERENCE TO RELATED APPLICATIONS

This application is the National Stage of PCT/ES2016/000083 filed on Jul. 22, 2016, which claims priority under 35 U.S.C. § 119 of Spanish Application No. P 201500579 filed on Jul. 31, 2015, the disclosures of which are incorporated by reference. The international application under PCT article 21(2) was not published in English.

The present invention relates in general to a cooking appliance for processing food, more specifically to a cooking appliance of the type that include a body housing an electric motor, a shaft for actuating a processing tool, and an integral handle, the various processing tools being coupled to the body by means of an arm that comprises an implement, such as a grinding, whisking or mixing implement, where the operating control of the appliance (on, off, rotating speed of the implement, etc.) is carried out by means of a sensor system that can detect a characteristic or predetermined movement performed on the appliance and can interpret said movement as an operating instruction, for example, turning the implement on, turning it off, and establishing and controlling the rotating speed thereof, etc.

Arm blenders, for example, in which an electric motor actuates the rotation of the blade of a blender arm that can be coupled to the blender to grind and mix food are well known in the prior art. Typically, the blender arm is controlled by a control element that manages the electrical power to operate the motor and adjust the rotating speed. Conventionally, said appliances include buttons and/or dials for interaction with the user in order to adjust the operating parameters of the motor, such that the user by pressing said buttons and/or turning said dial turns on, selects the rotating speed and turns off the appliance; for safety reasons, it is usual that pressure must be exerted continuously on the start/stop buttons during the entire operation.

A drawback of these known devices is that their operation requires the user to use both hands, one to hold the appliance and press the start/stop buttons and another to change the rotating speed of the implement; the participation of another person or device may even be necessary in order to hold the container with the product to process.

To solve this drawback, document EP2334219, "Motor-powered kitchen device having two push buttons for operation of the motor at alternative rotating speeds", for example, describes a cooking appliance with an electric motor for actuating a processing tool, the cooking appliance comprising a first button that can be pressed down to operate the motor at a first rotating speed, said first button closing when pushed down a first electric switch that operates the motor at a first rotating speed, and the cooking appliance also comprising a second button that can be pressed down to operate the motor at a second rotating speed, said second button closing when pushed down a second electric switch to operate the motor at a second rotating speed; where said motor can be operated at the second rotating speed only when the first and second switch are both closed and where the first button presents a first drag area in which a second drag area of the second button can act in order to drag the first button when the second button is pushed down, that is, the buttons are joined functionally.

Similarly, international patent application WO2005008511, "Control dial and ejector button for hand-held appliance", describes an arm blender that includes a control dial only partially exposed to the user that allows turning on, turning off and changing the rotating speed with a single finger while the appliance is held with the same hand.

However, the solutions provided by the aforementioned documents are not fully satisfactory, as they still require the user to act on pressure elements or dials that must be kept in specific actuation position by applying some force with a finger or the hand, and the presence of these pressure elements or dials hinder the cleaning of the appliance, particularly due to the dirt accumulated by these moving parts.

Thus, an object of the present invention is to provide a cooking appliance for processing food, of the type that include a body housing an electric motor, a shaft for actuating a processing tool, and an integral handle, the various processing tools being coupled to the body by means of an arm that comprises an implement such as a grinding, whisking or mixing implement, where the operating control of the appliance (on, off, implement rotating speed, etc.) is performed by means of a sensor control system that can detect a characteristic or predetermined movement performed on the appliance and can interpret said movement as an operating instruction, for example, turning on the implement, turning it off, and establishing and controlling the rotating speed thereof, etc.

For this purpose the appliance of the invention includes a control system based on sensors that can respond to physical movement stimuli, such as inclination of the appliance or turning of the same to the left or right, instead of traditional control means such as buttons or dials. Said sensor based control system, hereinafter referred to as the sensor control system, includes acceleration and gyroscopic sensors that capture parameters of the device movement performed by the user, specifically changes in the acceleration time and angular velocity in three spatial axes, and transmit this information to a microcontroller. The microcontroller records and saves the parameters obtained and compares them to predetermined patterns previously established in the microcontroller, checking if said parameters match the predetermined parameters, in which case a motor control system associated with the microcontroller makes the motor carry out the operations assigned to the predetermined patterns, for example turning it on, increasing or decreasing the rotating speed thereof, or turning it off.

Preferably, the microcontroller of the sensor system also filters the information obtained from the sensors, such as the acceleration and angular velocity, eliminating potential parasitic signals, due for example to movements due the inertia of the appliance or involuntary or random movements, in order to obtain a filtered signal that can be compared to the predetermined patterns.

In one embodiment of the invention the information obtained from the sensors is only filtered when the user consciously determines to do so, such as by pressing a sensor reading activation button associated with the microcontroller, so that the microcontroller will only compare the information values obtained to the predetermined parameters when these movements are performed intentionally and not due to involuntary actions, so that the microcontroller will not send actuation commands to the control of the associated motor unless the sensor reading is voluntarily activated.

Figure 1:
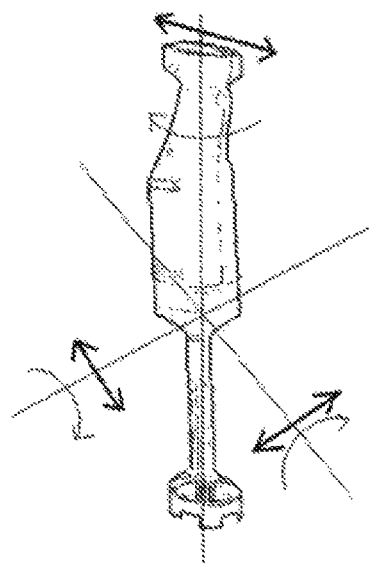
FIG. 1 shows the three spatial axes in which the aforementioned sensor system parametrises speed and angular velocity changes performed by the user on the appliance of the invention.
Figure 2A:
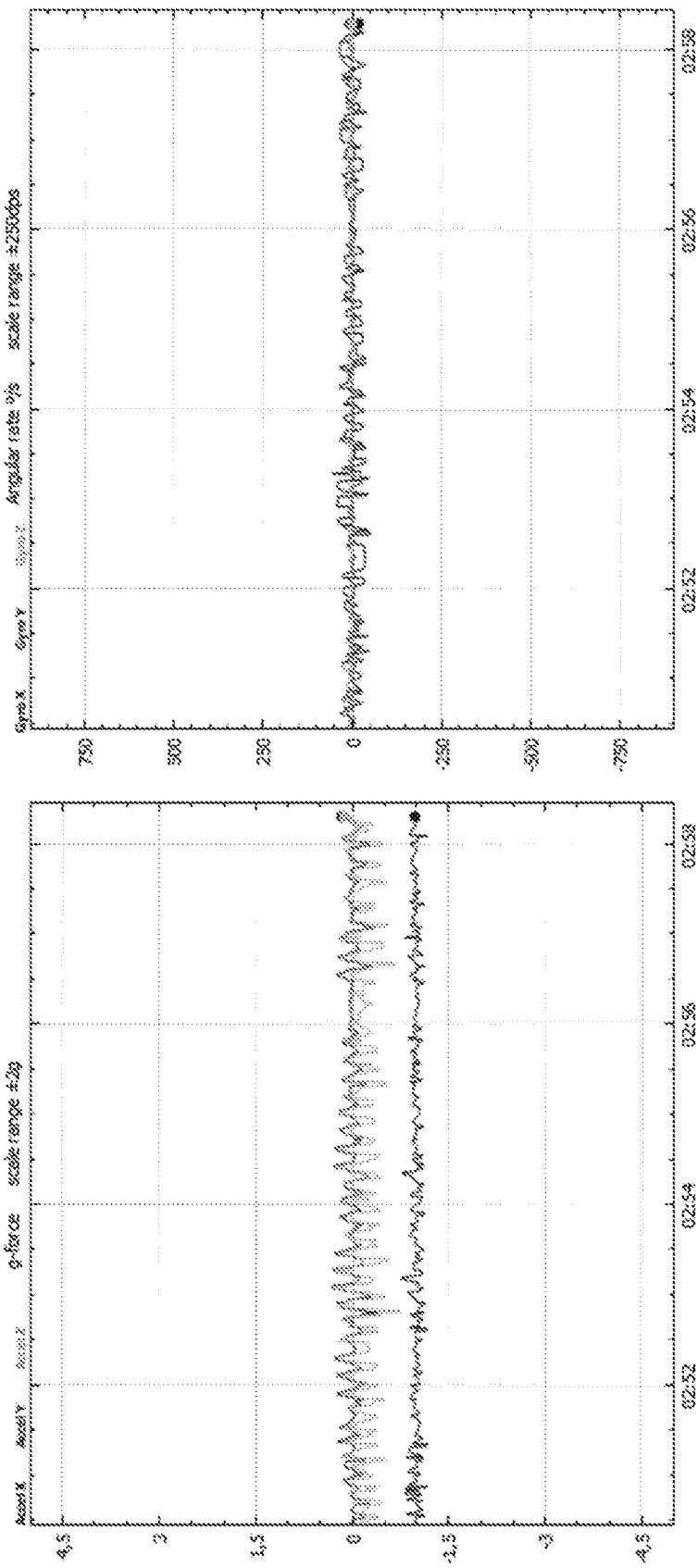
FIG. 2A shows an example of the measurement signal for the rotating speed and acceleration parameters without filtering.
Figure 2A:
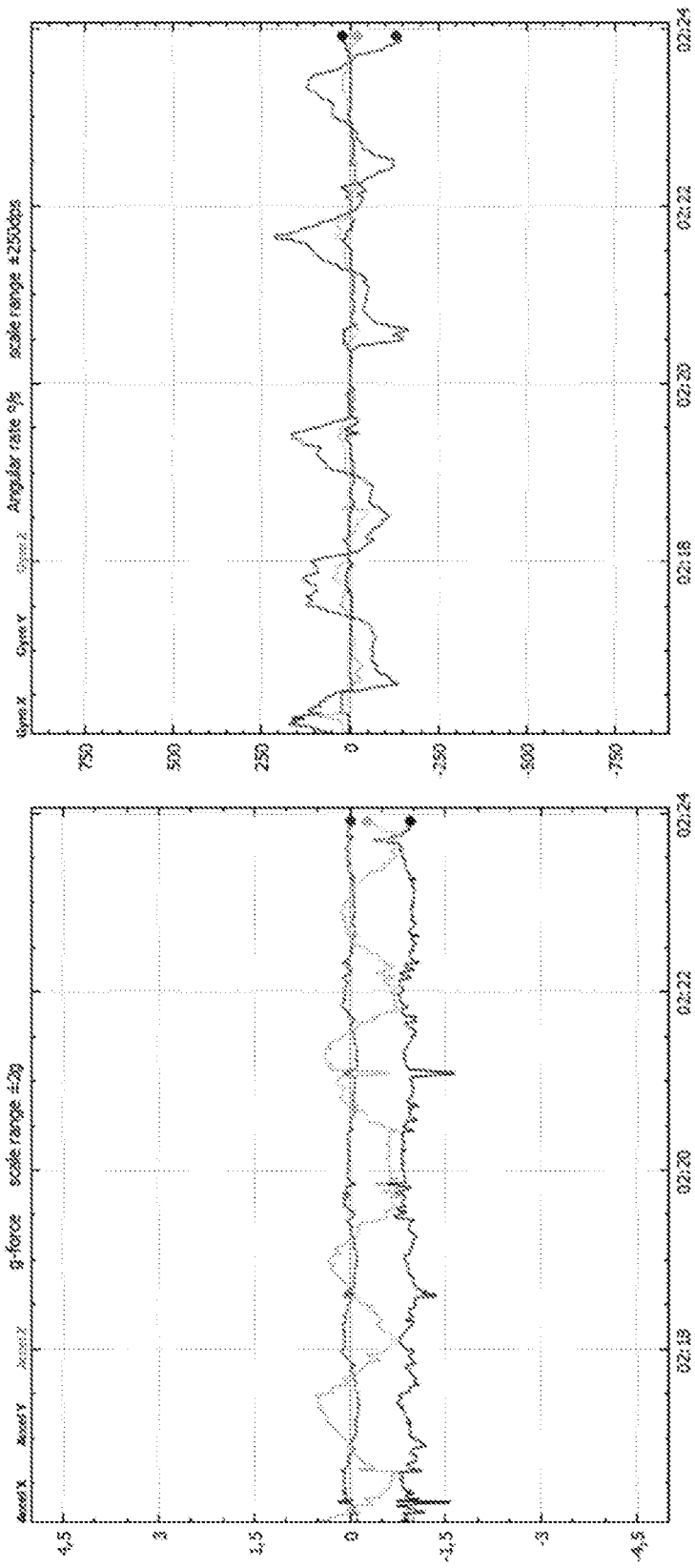
Figure 2B:
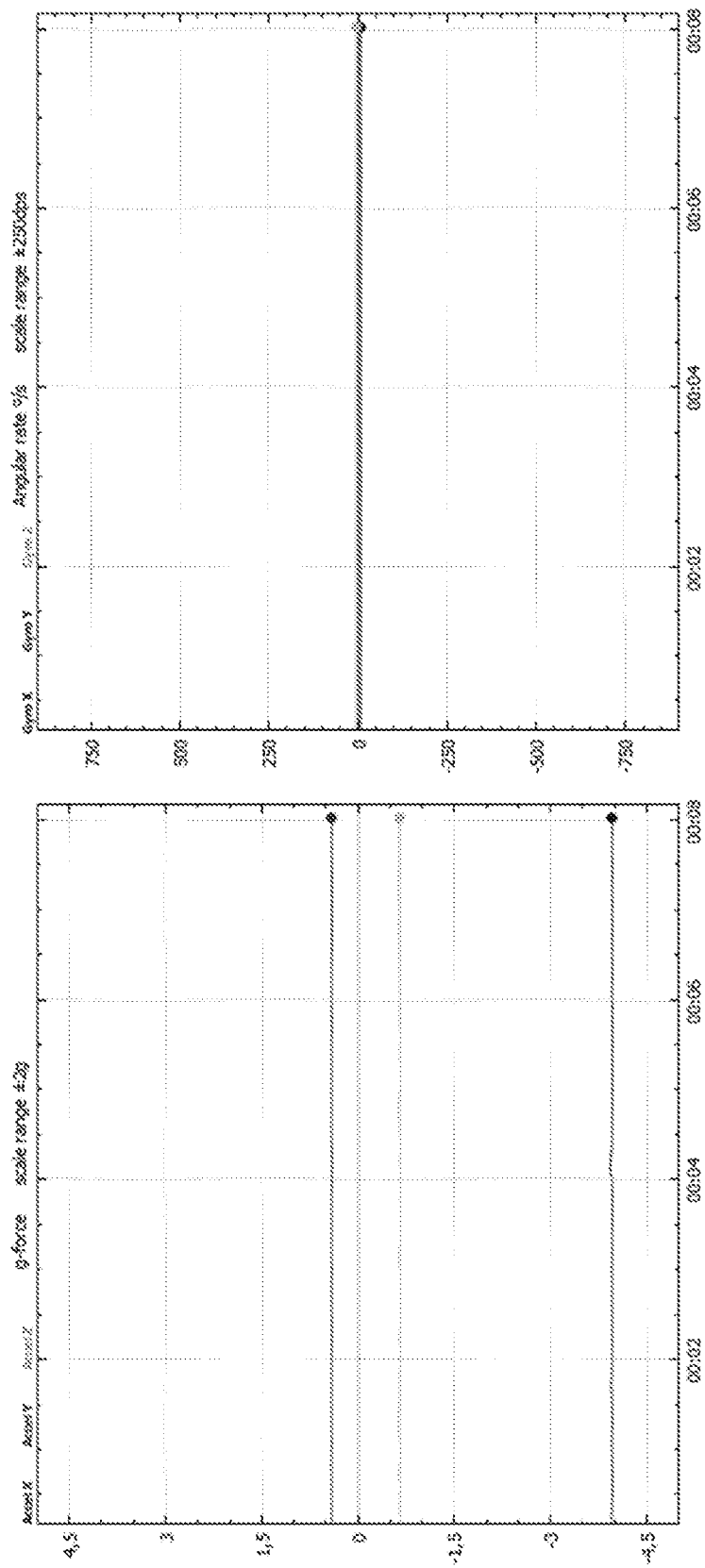
FIG. 2B shows the signal after it is filtered.
Figure 2B:
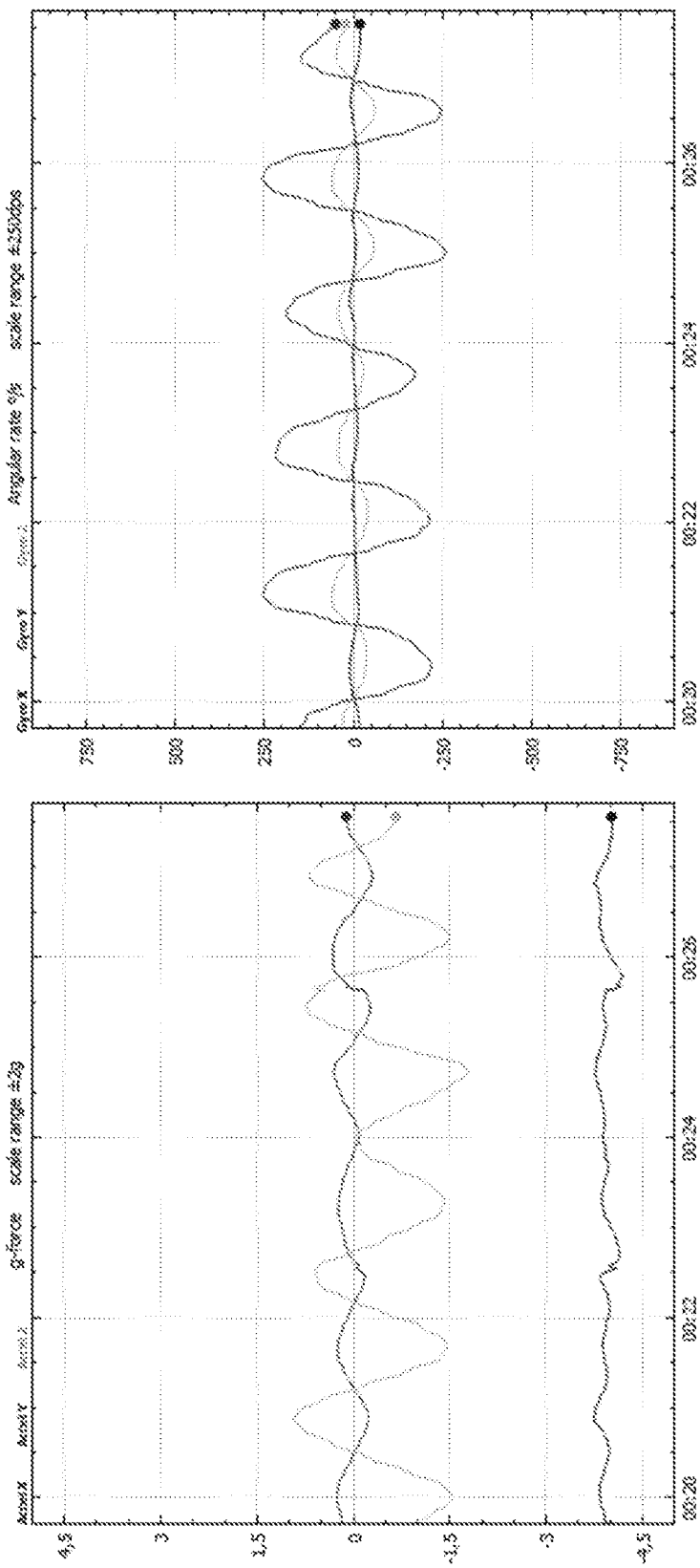
Figure 3:
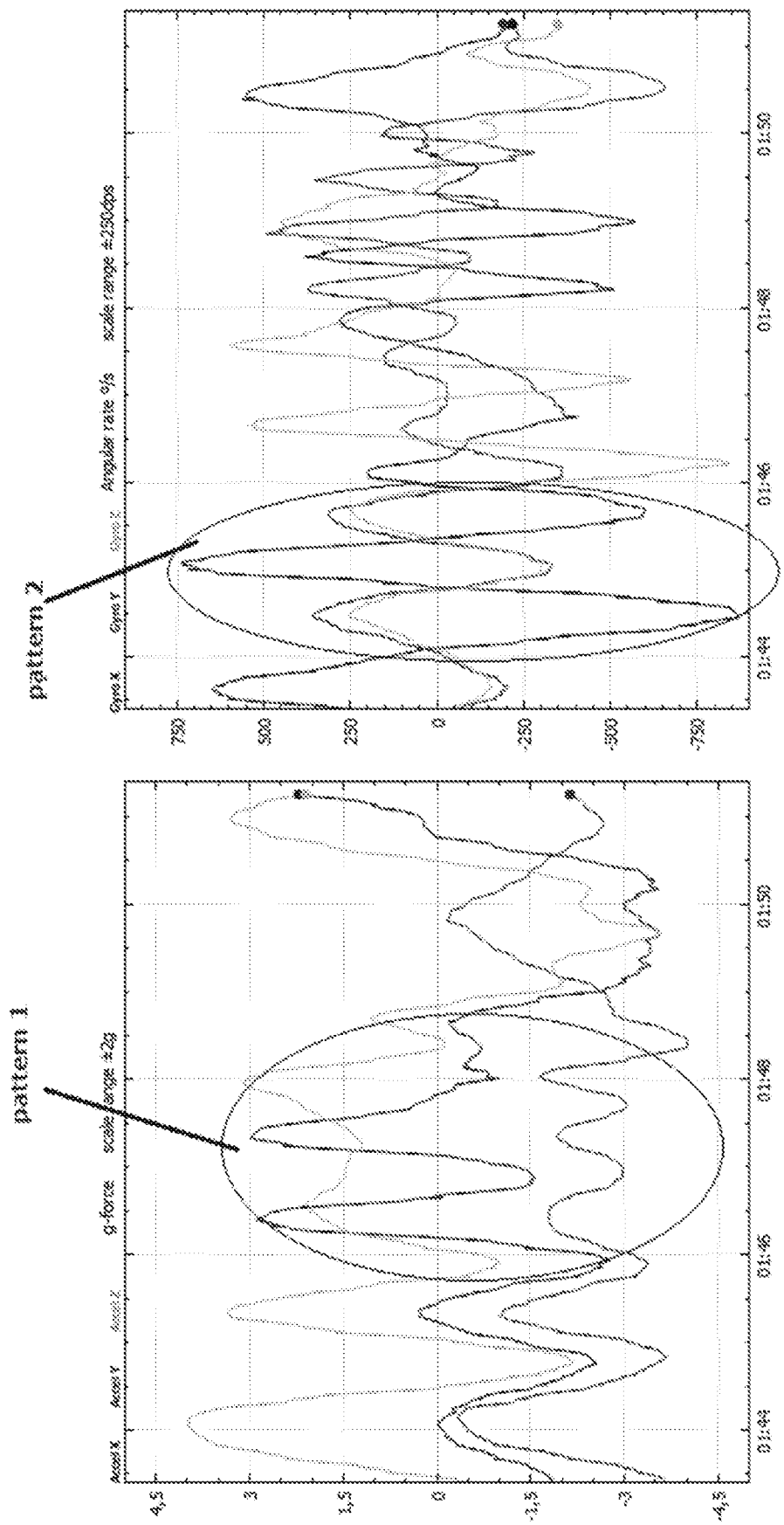
FIG. 3 shows a reading of the data gathered by the sensor system of the appliance indicating those that the microcontroller interprets as a pattern in order to send the correct operation command to the motor control system.
Figure 4:
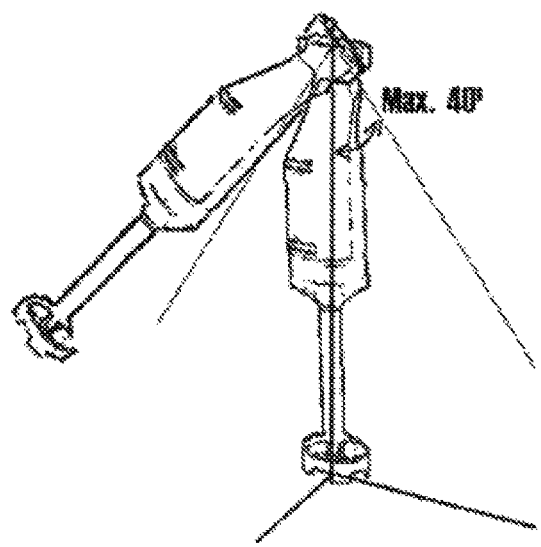
FIG. 4 shows an example of the operating limits for the inclination of the appliance.

In one embodiment of the invention the appliance, and specifically its sensor control system and its associated motor control system, also gathers and parametrises the various inclination angles of the appliance during the use thereof, so that the microcontroller identifies if the working position is correct; in a specific example, if the appliance is in an essentially vertical position, in which case the microcontroller commands the motor control system to change to operating status, or if it deviates from this correct position by a number of degrees, such as +40° or −40° to the vertical, in which case the microcontroller informs the motor control system to change to the stopped status, providing additional safety in use.

For purposes of illustration and not limiting the invention, one example of embodiment is designed to provide five speed settings, in which the minimum speed corresponds to setting 1, such as 3,500 rpm, and the maximum speed corresponds to setting 5, such as 10,000 rpm.

When the start button is pushed for a short time, for example 1 second, accompanied by a gentle wrist motion, such as turning the appliance to the left or the right while keeping it vertical, the gyroscopic sensors and accelerometers provide to the microcontroller the corresponding acceleration and speed parameters and said microcontroller interprets the signal which when filtered and compared to a start-up pattern will send the start-up command to the motor control system, turning on the implement at for example a medium speed on setting 3.

Once started, a rotation of the wrist about a vertical axis, for example to the right, by some degrees, for example 15-20°, returning to the initial position after a specific time, for example 1-2 seconds, will be detected by the appliance sensor control and the corresponding data signal will be sent to the microcomputer; when filtered this signal will be compared to a predetermined pattern, such as a pattern for increasing the rotating speed by one setting, such as "change from speed setting 3 to speed setting 4", and if the patterns match the microcontroller will send a corresponding signal to the motor control system to increase the speed.

In this case a rotation in the opposite direction, to the left about a vertical axis, such as from 33° to 35°, returning to the initial position in a time of 1-2 seconds, will be interpreted by the microcontroller as a request to reduce the rotating speed, such as to speed setting 2.

To stop the appliance the start/stop button is pressed or the appliance is inclined a certain angle to the vertical, such as +40° or −40°, which will be interpreted by the microcontroller as a danger situation or as a stop command, so that the motor control system will issue the corresponding stopping command. The angle to the vertical can be predetermined as a stopping pattern in the microcontroller or be programmed as a stopping pattern by the user.

The invention claimed is:

1. A cooking appliance for processing food, comprising:
   a body housing an electric motor,
   a shaft for actuating a processing tool,
   an integral handle,
   an arm integrating an implement for coupling several processing tools to the body,
   a sensor control system based on gyroscopic and accelerometer sensors that are configured to detect a characteristic or predetermined movement performed on the appliance,
   a microcontroller that is configured to interpret said movement as an operating instruction, and
   a control system for the motor associated with the microcontroller,
   wherein the microcontroller records and stores movement data obtained from the sensors and compares the movement data to predetermined patterns previously established in the microcontroller, and activates the control system to perform operations assigned to the predetermined patterns if the movement data coincide with the predetermined patterns, wherein the predetermined patterns relate to rotation of the device about a vertical axis, and wherein the operations performed in response to the predetermined patterns comprise changing a speed of the motor.

2. The cooking appliance for processing food according to claim 1, wherein the microcontroller also filters the movement data obtained from the sensors, eliminating potential parasitic data due to movements resulting from the inertia of the appliance or involuntary or random movements, in order to obtain a filtered signal for comparison with the predetermined pattern.

3. The cooking appliance for processing food according to claim 2, wherein the microcontroller filters the information obtained from the sensors when the user consciously determines, by pressing a sensor reading activation button associated with the microcontroller, so that the microcontroller will only compare the information values obtained to the predetermined parameters when these movements are performed intentionally and not due to involuntary actions, so that the microcontroller will not send actuation commands to the control of the associated motor unless the sensor reading is voluntarily activated.

4. The cooking appliance for processing food according to claim 1, wherein the microcontroller also records various angles of inclination of the appliance during its operation, wherein microcontroller causes the control system to start or stop operation when a maximum angle of deviation from a vertical position is reached.

5. The cooking appliance for processing food according to claim 4, wherein the maximum angles of deviation from the vertical position for the microcontroller to start or stop operation are +40° or −40° with respect to vertical.

6. The cooking appliance for processing food according to claim 4, wherein the maximum angles of deviation from the vertical position for the microcontroller to start or stop operation are programmed by the user in said microcontroller.

* * * * *